Jan. 10, 1928.
A. MÉLOTTE
1,656,124
MILKING MACHINE
Filed June 22, 1925
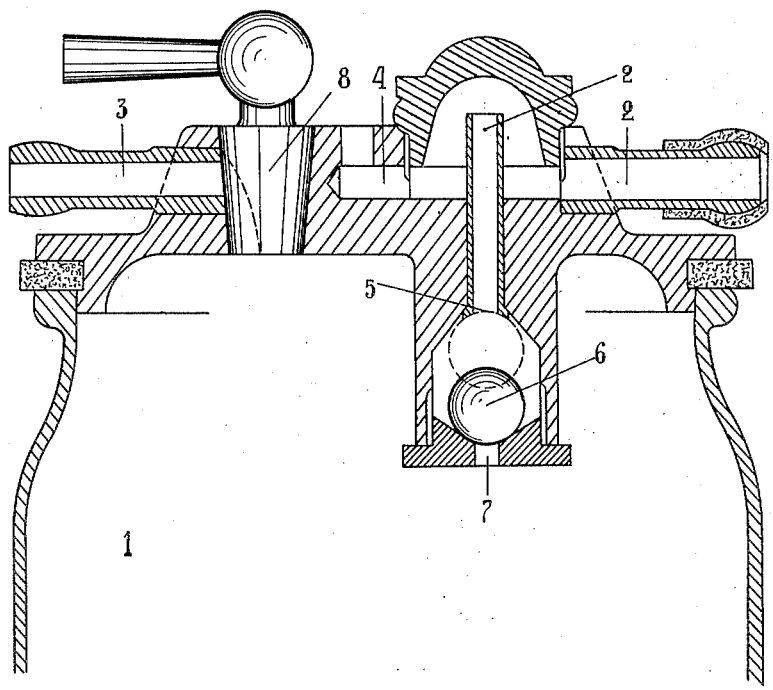
Inventor:
Alfred Mélotte
By
Attorney.

Patented Jan. 10, 1928.

1,656,124

UNITED STATES PATENT OFFICE.

ALFRED MÉLOTTE, OF BRUSSELS, BELGIUM.

MILKING MACHINE.

Application filed June 22, 1925, Serial No. 38,827, and in Belgium July 29, 1924.

The present invention relates to a collecting vessel or receiver for milking machines, to which is attached a device which acts automatically to prevent the level of the milk in the vessel from rising above a predetermined height.

It has been proposed to utilize for the purpose stated a valve which is raised by the milk, on reaching a certain level in the vessel, so as to block up or close the duct through which the suction action is transmitted to the interior of the aforesaid vessel; and the object of my invention is to combine a safety device of the kind just stated with a device or arrangement for automatically maintaining the suction in the interior of the vessel and in the ducts which it feeds if the suction ceases to feed said vessel.

For this purpose, the duct which transmits the suction exerted by the partial vacuum to the vessel is extended beyond the seat whereon the valve automatically seats itself when the level of the milk reaches a certain height; such extension providing a second seat against which the aforesaid valve can seat itself if the suction ceases to be transmitted to the vessel.

Other characteristic features of the invention are described hereinafter with reference to the accompanying drawing which illustrates, by way of example, a vertical sectional view of one form of construction of the invention.

The milking machine, the upper part alone of which is shown, comprises a vessel or receiver 1 which collects the milk which is drawn into it by the action of suction upon the udder of the animal. The vacuum causing this suction is produced by any means and is transmitted through a duct 2 opening out into the upper part of the vessel and is then transmitted to the udder of the animal through a channel 3 which at the same time serves to establish the flow of milk. The suction of the milk is also assisted in the well known manner by the action of a pulsator which is supplied through a by-pass 4 branched upon the duct 2.

The combined action of this pulsator (not shown) and the suction upon the udder of the animal causes milk to flow into the receiver 1 through the channel 3.

As milking machines frequently do not comprise any device for stopping automatically the flow of milk into the collecting vessel 1 when the latter has been filled up to a predetermined level, I provide, in order to overcome this disadvantage, a valve for controlling the suction duct and which is actuated by the liquid rising in the vessel 1.

It is to be noted in this connection that the milking apparatus may be put out of action by simply stopping the suction upon the udder, the pulsator continuing to operate. Consequently the delivery of milk may be cut off by interposing the above mentioned valve at a point such that the by-pass 4 continues to be supplied through the duct 2 when the said valve is closed. I therefore arrange the valve, consisting of a ball in the form of construction shown, so as to act upon the outlet orifice 5 of the duct 2 of the vessel 1.

The said ball is located in a chamber 6, the bottom of which comprises a second orifice 7 for putting the chamber into communication with the vessel.

When the apparatus is at rest the weight of the ball causes it to occupy the position shown in the drawing, in which it rests upon the bottom of chamber 6 and closes the orifice 7, said bottom being slightly dished so as to center the ball in that position. Due to the action exerted by the vacuum transmitted through the duct 2 when the apparatus is started, the ball is slightly raised and the apparatus operates in the usual manner until the level of the milk reaches the level of the ball.

After this, the ball is raised by the liquid until it occupies the position shown in dotted lines when the liquid is approximately at the level shown by the dotted lines. The effect of the suction can then no longer be transmitted through the vessel 1 to the udder of the animal and the flow of milk is automatically stopped.

It is also to be noted that this result may also be obtained by actuating the stop cock 8 which controls the channel admitting milk into the said vessel 1.

The valve employed may naturally be of ordinary construction and it may be placed at any point in the suction duct communicating with the udder of the animal; this valve may in particular be arranged at a certain distance from the vessel and be controlled by a float which would be connected to it by suitable rodding.

It also goes without saying that the ball utilized has a weight which is suitable to the use to which it is put and that it may be raised and pressed against the orifice 5 by the milk rising in the receiver. It may in particular be made of wood or rubber.

What I claim is:

1. In a milking machine, a receiver for milk, a cover for the receiver having an inlet duct for the milk opening through it into the interior of the receiver and also having a suction duct, and an automatic valve device within the receiver applied to the suction duct to connect it with the receiver; said valve device comprising a casing fixed to the cover and constituting an extension of the suction duct and having upper and lower internal valve seats, and a valve movable freely therein between said seats, the valve adapted to be raised into the upper seat by the milk as the latter rises in the receiver during the continuance of the milking operation so as to shut off the suction from the receptacle, and adapted to seat itself automatically in the lower seat, if the suction ceases to feed the receiver, so as to seal said lower seat and thereby prevent the entrance of air into the receiver.

2. In a milking machine, a receiver for milk; a cover for the receiver having an inlet duct for the milk opening through it into the interior of the receiver and also having a suction duct; and an automatic valve device within said receiver applied to the suction duct to connect it with the receiver, said valve device comprising a casing permanently attached to said cover and provided with a bottom valve seat and with a tubular member opening into the casing at one end and extending at the other end above the suction duct, and a ball valve movable freely in such casing and adapted to be raised above said seat by the suction, and to seat itself automatically on the seat when the suction ceases so as to seal the same and thereby prevent the entrance of air into the receiver.

3. In a milking machine, a receiver for milk; a cover for the receiver having an inlet duct for the milk opening through it into the interior of the receiver and also having a suction duct; and an automatic valve device within said receiver applied to the suction duct to connect it with the receiver, said valve device comprising a casing permanently attached to said cover and provided with upper and lower internal valve seats, and a ball valve movable freely in such casing between said seats and adapted to be moved against the upper seat and thereby cut off the suction when the receiver has been filled to a certain level, and to drop by gravity upon the lower seat when the suction ceases so as to seal said lower seat and thereby prevent the entrance of air into the receiver.

In testimony whereof I affix my signature.

ALFRED MÉLOTTE.